United States Patent [19]
Gray et al.

[11] 3,793,212
[45] Feb. 19, 1974

[54] DETERGENT COMPOSITION AND METHOD OF PREPARING SAME

[75] Inventors: Frederick William Gray, Summit; Peter Arthur Munger, Mountain Lakes, both of N.J.

[73] Assignee: Colgate-Palmolive Company, New York, N.Y.

[22] Filed: July 23, 1971

[21] Appl. No.: 165,701

Related U.S. Application Data

[63] Continuation of Ser. No. 780,216, Nov. 29, 1968, abandoned.

[52] U.S. Cl................ 252/99, 23/105, 23/106, 23/107, 252/138, 252/539
[51] Int. Cl................................................ C11d 7/56
[58] Field of Search......252/99, 138, 539; 23/105, 23/106, 107

[56] References Cited
UNITED STATES PATENTS

| | | | |
|---|---|---|---|
| 3,390,093 | 6/1968 | Feierstein et al. | 252/138 |
| 3,248,330 | 4/1966 | Feierstein | 252/99 |
| 2,990,375 | 6/1961 | Steinhauer et al. | 252/138 |
| 3,344,174 | 9/1967 | Browssalian | 252/161 X |
| 3,248,335 | 4/1966 | Teot et al. | 252/539 |

OTHER PUBLICATIONS

Levitt – Oils, Detergents and Maintenance Specialties, Vol. 2, 1967, pages 79–81.

*Primary Examiner*—Mayer Weinblatt
*Attorney, Agent, or Firm*—Herbert S. Sylvester; Murray M. Grill; Norman Blumenkopf

[57] ABSTRACT

A detergent composition for automatic dishwashers is prepared by hydrating an alkali metal trimetaphosphate by reaction with a sodium hydroxide solution in the presence of an anionic wetting agent selected from sodium dodecyldiphenyl ether disulfonate or sodium 2-acetamido hexadecane-1-sulfonate or mixtures thereof. The hydrated tripolyphosphate is formulated with an alkali metal silicate, a bleach composition and sodium sulfate to form an excellent detergent composition.

4 Claims, No Drawings

DETERGENT COMPOSITION AND METHOD OF PREPARING SAME

This application is a continuation of Ser. No. 780,216, filed 11-29-68, now abandoned.

The present invention relates to a detergent composition for use in washing china, glassware and silverware and more particularly to a composition for use in automatic dishwashing equipment.

Such compositions must meet rigid specifications in order to be commercially acceptable. The composition must not attack the overglaze decoration on fine china; it must not tarnish silverware, nor allow spotting on glassware. Further it must not be corrosive to metals such as are used in automatic dishwashers; it must not cake during shelf-life nor gel within the washing machine. The composition contains a bleach composition which has chlorine available for sanitizing the china, etc.; and this chlorine must not be lost during shelf-life.

Clearly, meeting all of these criteria presents many problems since, frequently, in solving one problem, one or another of the other difficulties reoccur.

In dishwashing compounds generally, a detergent such as an alkali metal phosphate is emloyed. It is known that sodium tripolyphosphate, alkali metal pyrophosphate or orthophosphate and sodium hexametaphosphate have been used. More recently it has been found that sodium tripolyphosphate hexahydrate is useful in such compositions. However, as frequently occurs in preparing the hexahydrate from the tripolyphosphate or trimetaphosphate, the reaction product contains excess water of hydration which seriously and adversely affects certain characteristics of the composition, such as chlorine stability and, of course, the caking of the composition during shelf-life.

The commercially available hexahydrate of alkali metal tripolyphosphate is unsuitable for use in the detergent compositions of the present invention due, it is believed, to excess water of hydration which impairs the anti-caking characteristics and also impairs chlorine stability by causing the release of chlorine during shelf-life.

According to the present invention, a very suitable hexahydrate of alkali metal tripolyphosphate is prepared, in situ, so to speak, which when formulated into the dishwashing composition ensures the chlorine stability and markedly improves the anticaking properties during shelf-life without impairing other desirable characteristics of the composition.

More specifically, an alkali metal silicate, in which the ratio of $SiO_2/Na_2O$ is from 1:2 to 1:3.2, in water, an alkali metal sulfate and an anionic wetting agent, such as sodium 2-acetamidohexadecane-1-sulfonate, or sodium dodecyldiphenyl ether disulfonate or mixtures thereof are combined and mixed until a consistent form was obtained. An alkali metal trimetaphosphate is added and the temperature raised to about 140°F. Next a 50 percent solution of sodium hydroxide was added. A vigorous reaction ensued and the temperature of the reaction mass rose to about 220°F with substantial "fluffing" or frothing. During the reaction period a substantial amount of water vapor was evolved. After a short time the reaction subsided and the crumbly material which was nearly dry to the touch was further dried by heating at 140°F until a constant weight was obtained. The product containing the alkali metal tripolyphosphate hexahydrate had a water content of about 21 percent (Ohaus Moisture Analysis).

A bleach composition was prepared by dry mixing an alkali metal dichloroisocyanurate, an alkali metal sulfate and a portion of the hexahydrate of the alkali metal tripolyphosphate. About 8 parts by weight of the bleach composition is added to about 92 parts by weight of the tripolyphosphate hexahydrate. The proportion of the dichloroisocyanurate is such that there is provided in the final composition about 1 percent available chlorine.

The dichloroisocyanurate is first mixed into the bleach composition before mixing with the hexahydrate material so as to ensure a more uniform distribution of the chlorine in the final composition.

The wetting agent which is added to the initial step for hydrating the trimetaphosphate to the tripolyphosphate hexahydrate is, of course, present in the final composition and is initially added so that it has a concentration in the final composition of from 0.5 to 2.5 percent. It was found also that when the pH value was near 10 there was no damage to overglaze decoration on fine china.

It has been found that better overall results are obtained when the sodium 2-acetamidohexadecane-1-sulfonate is used alone or in admixture in equal parts with sodium dodecyldiphenyl ether disulfonate.

The following specific example will illustrate the present invention:

| | |
|---|---|
| sodium silicate ($SiO_2/Na_2O$ ratio 1:2.35) | 230 grams |
| water | 160 grams |
| sodium sulfate | 12 grams |
| sodium dodecyldiphenyl ether disulfonate | 8 grams |
| sodium 2-acetamidohexadecane-1-sulfonate | 8 grams |
| sodium trimetaphosphate | 368 grams |

The above materials were thoroughly mixed to form a consistent foam and heated to 140°F. Then sodium hydroxide (50 percent solution) 192 gm. heated to 140°F was added to the above foam. In about one minute the temperature rose to about 220°F with marked "fluffing" or frothing with strong evolution of water vapor during the reaction which was completed in about 3 minutes. The reaction mass was "crumbly" and nearly dry to the touch. It was then dried to a constant weight by heating to 140°F. The water content was about 21 percent (Ohaus Moisture Analysis).

To 92 parts by weight of the sodium tripolyphosphate hexahydrate material thus prepared were added 8 parts by weight of a bleach composition containing:

| | |
|---|---|
| 20% | potassium dichloroisocyanurate |
| 30% | sodium tripolyphosphate hexahydrate |
| 47.5% | sodium sulfate |
| 2.5% | ultramarine blue |

If desired also, a very small amount of a suitable perfume (0.02 percent) may be added at this stage.

The purpose of mixing the bleach composition and then adding it to the hexahydrate material is to ensure uniform distribution of the dichloroisocyanurate in the final composition.

The final dishwashing detergent has an approximate composition of:

| | |
|---|---|
| 58% | phosphate (90% sodium tripolyphosphate hexahydrate) |
| 14% | sodium silicate (SiO₂/Na₂O ratio 1:2.4) |
| 5% | sodium sulfate |
| 2% | wetting agent |
| 1.5% | potassium dichloroisocyanurate (0.9% available chlorine) |
| 19% | water |
| balance | dyestuff and perfume |

The pH value of a 1 percent solution of the detergent was approximately 10.2.

Subsequent dishwashing tests showed that the chlorine stability was excellent and that the other criteria concerning spotting of glassware, tarnishing of silverware, protection of overglaze decoration of fine china, cleaning, sanitizing, caking during shelf-life, gelling during use, and foaming were all excellent.

Although reference has been made to specific compounds and quantities in the above description and in the appended claims, it will be understood to those familiar with this art that equivalents are to be included by the terminology used.

It will be apparent that changes and modifications of the various features described herein may be made without departing from the spirit and scope of the invention. It is therefore apparent that the foregoing description is by way of illustration of the invention rather than limitation thereof.

We claim:

1. A method for preparing a composition suitable for use in automatic dishwashing processes comprising preparing a pre-mixture of sodium or potassium trimetaphosphate, water, sodium or potassium silicate having a silicon oxide to metal oxide ratio of from 1:2 to 1:3.2 and an amount of a wetting agent to provide from 0.5 to 2.5 percent thereof in the final composition, said wetting agent being selected from the group consisting of sodium dodecyl diphenyl ether disulfonate, sodium 2-acetamidohexadecane-1-sulfonate and mixtures thereof heating said premixture to about 140°C. and thereafter reacting same with an aqueous solution of sufficient sodium hydroxide to form the corresponding tripolyphosphate hexahydrate in a substantially dry form containing no excess moisture thereafter drying said reaction product at about 140°C. to constant weight and subsequently mixing said reaction mixture with sodium or potassium dichloro isocyanurate.

2. A method as claimed in claim 1 wherein the wetting agent is sodium dodecyldiphenyl ether disulfonate.

3. A method as claimed in claim 1 wherein the wetting agent is sodium 2-acetamidohexadecane-1-sulfonate.

4. A method as claimed in claim 1 wherein the dichloroisocyanurate is potassium dichloroisocyanurate.

* * * * *